United States Patent
Pruessner et al.

(10) Patent No.: US 9,989,831 B2
(45) Date of Patent: Jun. 5, 2018

(54) CHIP-SCALE TWO-DIMENSIONAL OPTICAL PHASED ARRAY WITH SIMPLIFIED CONTROLS

(71) Applicant: THE UNITED STATES OF AMERICA, AS REPRESENTED BY THE SECRETARY OF THE NAVY, Washington, DC (US)

(72) Inventors: Marcel W. Pruessner, Chevy Chase, MD (US); William S. Rabinovich, Silver Spring, MD (US); Rita Mahon, Silver Spring, MD (US); Peter G. Goetz, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days. days.

(21) Appl. No.: 15/447,297

(22) Filed: Mar. 2, 2017

(65) Prior Publication Data

US 2017/0255077 A1    Sep. 7, 2017

Related U.S. Application Data

(60) Provisional application No. 62/302,248, filed on Mar. 2, 2016.

(51) Int. Cl.
*G02B 6/26* (2006.01)
*G02F 1/29* (2006.01)
(Continued)

(52) U.S. Cl.
CPC ............. *G02F 1/292* (2013.01); *G02B 6/124* (2013.01); *G02B 6/2813* (2013.01); *G02F 2201/06* (2013.01)

(58) Field of Classification Search
USPC .................................................. 385/3, 8, 32
See application file for complete search history.

(56) References Cited

U.S. PATENT DOCUMENTS

| | | | |
|---|---|---|---|
| 6,870,967 B2* | 3/2005 | Wiesmann | G02B 6/12007 385/1 |
| 9,395,177 B2 | 7/2016 | Pruessner et al. | |
| 2007/0154141 A1* | 7/2007 | Miyadera | G02B 6/125 385/32 |

OTHER PUBLICATIONS

Doylend, et al., Two-dimensional Free-space Beam Steering with an Optical Phased Array on Silicon-on-insulator, Optics Express, Oct. 18, 2011, pp. 21595-21604, vol. 19, No. 22, OSA Publishing, Washington, DC.

(Continued)

*Primary Examiner* — Eric Wong
(74) *Attorney, Agent, or Firm* — US Naval Research Laboratory; Suresh Koshy

(57) ABSTRACT

A device includes an optical splitter comprising a plurality of splitter outputs. The splitter outputs are out of phase and include a non-uniform phase front. The device includes a one-dimensional phase compensation array communicating with the optical splitter. The phase compensation array receives the non-uniform phase front and outputs a uniform phase front. The phase compensation array includes a plurality of array outputs. The device includes a tunable linear gradient phase shifter communicating with said phase compensation array to impart a linearly-varying phase shift across said plurality of array outputs, thereby steering a beam along a first angle in a first plane. The device includes a waveguide grating out-coupler communicating with said linear gradient phase shifter, and a uniform phase shifter communicating with the waveguide grating out-coupler. The (Continued)

uniform phase shifter steers the flat phase front along a second angle in a second plane perpendicular to said first plane.

11 Claims, 9 Drawing Sheets

(51) Int. Cl.
  *G02B 6/124* (2006.01)
  *G02B 6/28* (2006.01)

(56) References Cited

OTHER PUBLICATIONS

Van Acoleyen et al., Two-dmensional optical phased array antenna on silicon-on-insulator, Optics Express, Jun. 10, 2010, pp. 13655-13660, vol. 18, No. 13, OSA Publishing, Washington, DC.
Kwong, et al., On-chip Silicon Optical Phased Array for Two-dimensional Beam Steering, Optics Letters, Feb. 15, 2014, pp. 941-944, vol. 39, No. 4, OSA Publishing, Washington, DC.
Chan, et al., Optical Beamsteering Using an 8×8 MEMS Phased Array with Closed-loop Interferometric Phase Control, Optics Express, Jan. 29, 2013, pp. 2807-2815, vol. 21, No. 3, OSA Publishing, Washington, DC.

* cited by examiner

CHIP-SCALE TWO-DIMENSIONAL OPTICAL PHASED ARRAY WITH SIMPLIFIED CONTROLS

CROSS-REFERENCE TO RELATED APPLICATIONS

The present application claims priority to U.S. Provisional Patent Application Ser. No. 62/302,248, which was filed on 2 Mar. 2016.

FIELD OF THE INVENTION

The present invention relates in general to optical phased arrays, and in particular to chip-scale optical phased arrays used for optical beam steering (where light is emitted) as well as for optical receivers, imagers and/or scanners (where light is received).

BACKGROUND OF THE INVENTION

Mechanical Beam Steering Using Gimbals and Fast Steering Mirrors

The simplest method of steering an optical beam is by use of mechanical means. An example of such standard mechanical means includes a standard, macro-scale gimbal 10, such as shown in FIG. 1. A light source and lens mounted on the gimbal 10 enables steering in any direction provided that the gimbal allows for rotation about the two primary axes. Macro-scale gimbals 10 are generally heavy (e.g., ~20 lbs.), require significant power (e.g., ~48 W) and are slow (e.g., <10 Hz); although smaller gimbals with improved performance are available, they are still macro-scale devices. For some applications (e.g. on board ships or fixed building installations), the Size, Weight, & Power ("SWAP") of macro-scale gimbals is not prohibitive. However, in other applications, the large SWAP is prohibitive and other non-mechanical beam steering solutions are needed.

While gimbals are generally used to coarsely point the FSO terminal, standard fast steering mirrors ("FSM") or standard piezo-controlled ("PZ") mirrors are often used for fine pointing of both the transmit and the receive beams. FSMs (e.g. Newport FSM-300 FSM) and PZs (e.g., CONEX-AG-M100D PZ) typically operate by controlling the beam reflection from a 1" mirror. The FSM deflects the beam by ±3°, whereas a PZ deflects the beam by ±0.750. Because one FSM or PZ is needed for both transmit and receive beams, two units and controllers are required in each interrogator. The weight of the FSM mirror is ~1 lb. and weight of the PZ is only ~85 g. Each needs additional controller electronics. For larger scale motions (e.g., 25 mrad), the FSM can operate at up to 50 Hz and, for very small (0.1 mrad) control loop motions, at up to 580 Hz. The PZ controlled pitch/yaw mount is generally regarded as a slower (<10 Hz) system but with absolute position encoding it has a very stable and reproducible pointing capability.

Chip-Scale Mechanical Beam Steering Using MEMS

Another method of steering an optical beam is by use of standard micro-electro-mechanical systems ("MEMS"). An example of a standard MEMS device for beam steering is a standard MEMS-based tip/tilt/piston micromirror 20, such as shown in FIG. 2. In general MEMS approaches simply implement mechanical beam steering similar to a gimbal, but at the micro-scale (i.e. characteristic lengths of hundreds of micrometers). MEMS mirrors are often preferred over lenses due to significant previous research and development by Texas Instruments (e.g., Texas Instruments' digital micromirror device ("DMD") for movie projectors) and Lucent Technologies (e.g., Lucent's optical cross-connect switch for optical networks). By fabricating a micro-mirror on a tip/tilt/piston actuator, the mirror can be positioned to reflect any incident light in a desired direction. Limitations of MEMS micromirrors include the limited response time (typically, in the 10 microsecond to millisecond-range) and modest fill-factor (e.g. 30% fill-factor and 7 dB insertion loss) due to the complicated actuator design which requires motion along several axes. For large-angle beam steering, a high fill-factor is essential since the steering angle is a direct function of the mirror separation and the amount of optical power in a steered beam depends on the mirror size and fill factor. Many optical MEMS components also only function as switches with two stable states (e.g. Texas Instruments' DMD) and are therefore not suitable for beam steering which requires continuously variable devices.

Chip-Scale Non-Mechanical Beam Steering Using Liquid Crystals

Another method of steering an optical beam is by use of standard liquid crystals ("LCs"). LCs are materials that can change their refractive index upon application of an electric field. For nematic LCs, the time-averaged field needs to be zero; otherwise, the LC will experience permanent ion migration and damage. Initial applications of liquid crystals to chip-scale beam steering have relied on surface-normal configurations, such as the surface-normal liquid crystal 30 shown in FIG. 3. Light is passed perpendicularly through a liquid-crystal phase modulator array. By applying an appropriate phase across the chip the incident beam can be steered in any direction. Initial demonstrations have shown the potential of using liquid crystals for up to +/−5° beam steering angles at sub-second response times. More recently, steering angles of +/−40° have been achieved using gratings (with the drawback that these devices are highly polarization dependent). The temporal response can be improved, although the speed is generally limited with surface-normal approaches. The requirement for a zero time-averaged electric field also may place some limitations on LC's and their applications.

Chip-Scale Non-Mechanical Beam Steering Using Liquid Crystal-Clad Waveguides

Another method of steering an optical beam is by use of a standard in-plane waveguide-based approach. In this method, the liquid crystal forms a top cladding in a thin core waveguide fabricated on a chip. The guided optical mode experiences a significant modal overlap with the liquid crystal top cladding. By applying a bias across the liquid crystal, the waveguide mode can attain a variable phase shift. In order to achieve beam steering along the wafer plane, the waveguide is terminated with a prism. A sawtooth electrode above the liquid crystal enables a variable phase front to be applied to the guided mode resulting in a variable beam steering along the θ-angle.

Steering along the φ-angle is achieved using a standard Ulrich coupler. In an Ulrich coupler, the waveguide core is made progressively thinner until light leaks out of the core at which point it is emitted through the substrate. The emission angle is governed by Snell's law and therefore depends on the effective index of the tapered waveguide section. The liquid crystal provides a controllable means for determining the mode effective index and hence the emission angle out of the chip. The switching speed is substantially improved over surface-normal approaches (such as shown in FIG. 3), although the fastest response time is still sub-millisecond. The manufacture of the liquid crystal based optical phased arrays also requires many custom fabrication processes that can make large-scale production challenging and cost-prohibitive.

Chip-Scale Non-Mechanical Beam Steering Using Silicon Photonics

In light of some of the challenges in the development of chip-scale optical phased arrays for beam steering, as discussed above, recent efforts have focused on using a silicon platform for chip-scale beam steering. Silicon platforms enable devices to be fabricated in existing foundries, generally older semiconductor electronics manufacturing facilities. This may lead to significant cost-savings with the potential for mass-production and large-scale adaptation in consumer electronics and other products.

The basic approach for standard silicon photonic optical phased arrays is to couple light into a single waveguide on a silicon chip, split the light into multiple waveguides, apply a variable phase shift to each waveguide, and then emit the light from each waveguide. The emitted light from the waveguides interfere so that in the far-field the emission looks like a focused beam that can be steered in any direction by varying the phase.

For example, a standard silicon photonic optical phased array approach uses sequential 1×2 splitters to achieve 16 waveguide channels. A standard triangular-shaped thin film heater above the waveguide provides a linear phase gradient so that a single control signal varies the phase shift via thermo-optic heating and hence steers the beam along the θ-angle. Light is coupled out of the chip using gratings fabricated along the length of each waveguide. Steering along the φ-angle is achieved by taking advantage of the wavelength-dependent emission angle of the grating out-couplers. Although this approach enables two-dimensional beam steering, it requires significant wavelength tuning (up to $\Delta\lambda=100$ nm) which is undesirable for many applications since it requires a tunable laser. Thermo-optic tuning can also require substantial electrical power (10's of mW to a few Watts depending on the size of the array). Finally, the cascaded 1×2 splitters result in a large separation between the output waveguides so that the steering angle and fill factor are limited. In practice, attempting to bring the output waveguides closer together tends to introduce phase errors.

A conventional improvement on the above-mentioned basic approach includes using a non-linear spacing between the waveguide emitters to help suppress the sidelobes present in phased arrays. This improvement results in larger steering angles. Indeed, a 10°-steering angle was achieved in silicon from which the authors claim >30°-steering angle for a beam propagating in free space. The improvement, however, also used thermo-optic phase shifters requiring substantial power. In order to reduce the power requirement, thermo-optic phase shifters utilizing direct current injection into a silicon waveguide has been used. For a standard, large-scale optical phased array using direct current injection, light from a single input waveguide is split into M-rows and N-columns. Each element-MN (row-M and column-N) has a grating out-coupler and a thermo-optic phase shifter utilizing direct current injection. In this manner, arbitrary phase profiles can be achieved so that any image can be displayed. The drawback with this approach, however, is complexity in the control signals: every emitter element requires a control signal (i.e., $N^2$-controls for an N×N array).

The prior art devices discussed above suffer from one or more deficiencies that make them unattractive in practice. For example, they are either large or heavy (e.g., gimbals), have a slow temporal response (e.g., MEMS and liquid crystals), require tunable lasers (e.g., silicon phased arrays with wavelength-steerable gratings), have significant power requirements (e.g., most thermo-optic based approaches), or require complex control signals of order N (e.g., direct current injection in large-scale silicon photonic phased arrays).

BRIEF SUMMARY OF THE INVENTION

An embodiment of the invention includes a device that includes an optical splitter comprising a plurality of splitter outputs. The plurality of splitter outputs is out of phase and includes a non-uniform phase front. The device includes a one-dimensional phase compensation array communicating with the optical splitter. The phase compensation array includes a plurality of serpentine optical waveguides. The phase compensation array receives the non-uniform phase front and outputs a uniform phase front. The optical splitter or the phase compensation array includes an optical input signal. The optical input signal includes a fixed free-space wavelength. Each serpentine waveguide of the plurality of serpentine waveguides includes a width of greater than the free-space wavelength.

An embodiment of the invention includes a device that includes a waveguide grating out-coupler. The device also includes a tunable uniform phase shifter communicating with the waveguide grating out-coupler. The tunable uniform phase shifter steers a flat phase front along a first angle in a first plane.

An embodiment of the invention is used for steering an emitted beam. Another embodiment of the invention finds application in the inverse problem, namely, steering for receiving or imaging applications.

An optical phased array ("OPA") refers to a device having multiple emitters, individual phases of which can be adjusted such that the emitters act in tandem to steer a beam. Applications of chip-scale optical phased arrays according to an embodiment of the invention include beam steering (where light is emitted) and receivers, imagers, or scanners (where light is collected). Chip-scale optical phased arrays according to an embodiment of the invention are advantageous because of their compact size, minimal weight, and reduced power requirements. Such chip-scale optical phased arrays according to an embodiment of the invention are also advantageous because their potentially reduced manufacturing costs enable such devices to find application in areas previously not considered owing to the high cost of prior beam-steering devices. For example, chip-scale optical phased arrays according to an embodiment of the invention are optionally used in automobiles in a manner similar to recently implemented radar systems for collision avoidance. Optical phased arrays according to an embodiment of the invention are optionally used in free-space optical ("FSO") communication systems.

Chip-scale devices according to an embodiment of the invention can be fabricated using standard, integrated circuit fabrication methods and therefore have the potential for low-cost manufacturing and large-scale adoption. As such, a variety of consumer applications ranging from smartphones to miniature projectors benefit from low-cost optical phased array chips according to an embodiment of the invention.

An embodiment of the invention requires only two control signals: one for steering along an azimuthal angle (i.e., the θ-angle) in a first plane and a second control for an elevational angle (i.e., the φ-angle) in a second plane that is perpendicular to the first plane. The simplified controls are preferable, for example, for portable applications, where complex control or calibration is not practical (e.g. portable electronics or other applications, where SWAP or cost considerations are important). The size of the OPA according to an embodiment of the invention can be scaled up without increase in complexity so that large optical apertures can be achieved.

An embodiment of the invention includes a fill factor advantage of prior art devices. For example a grating-based device according to an embodiment of the invention has the largest possible fill-factor along the ϕ-angle.

DETAILED DESCRIPTION OF THE INVENTION

Figure 1:
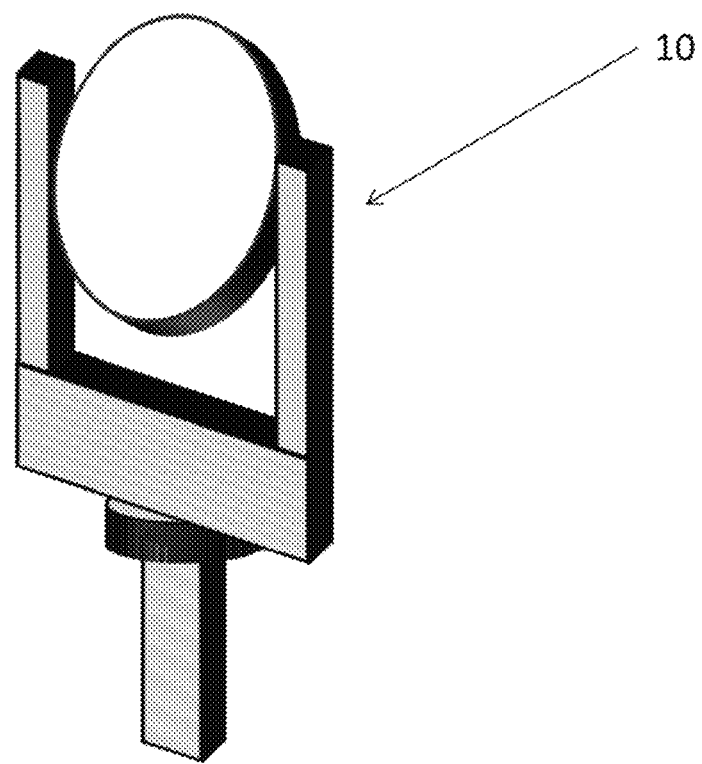
FIG. 1 is a perspective view of a standard, prior art, macro-scale gimbal.
Figure 2:
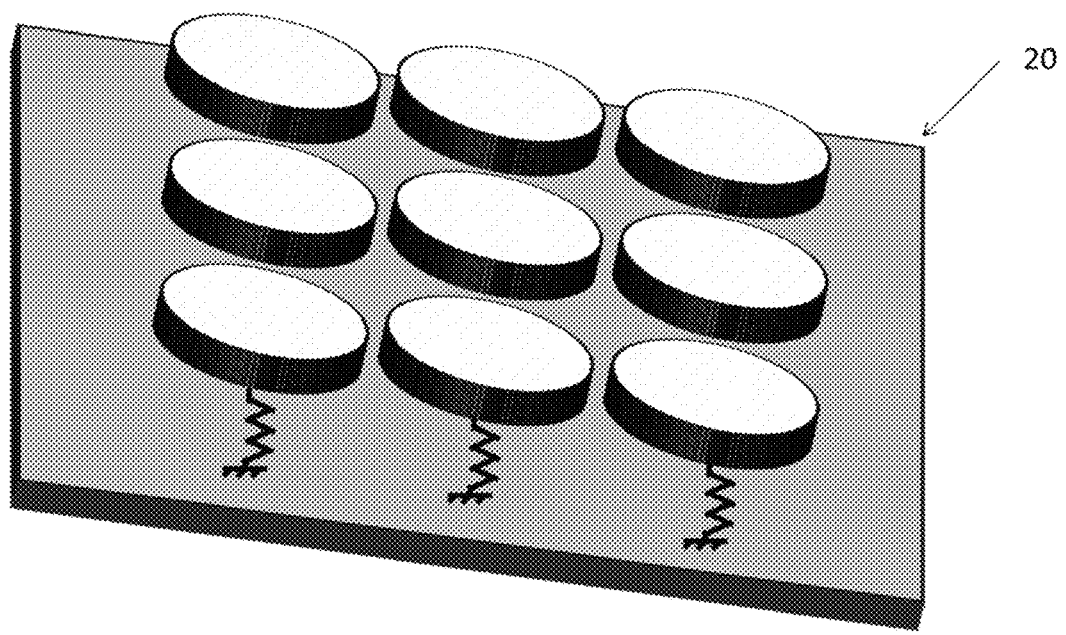
FIG. 2 is a perspective view of standard, prior art, micro electromechanical system steering mirrors.
Figure 3:
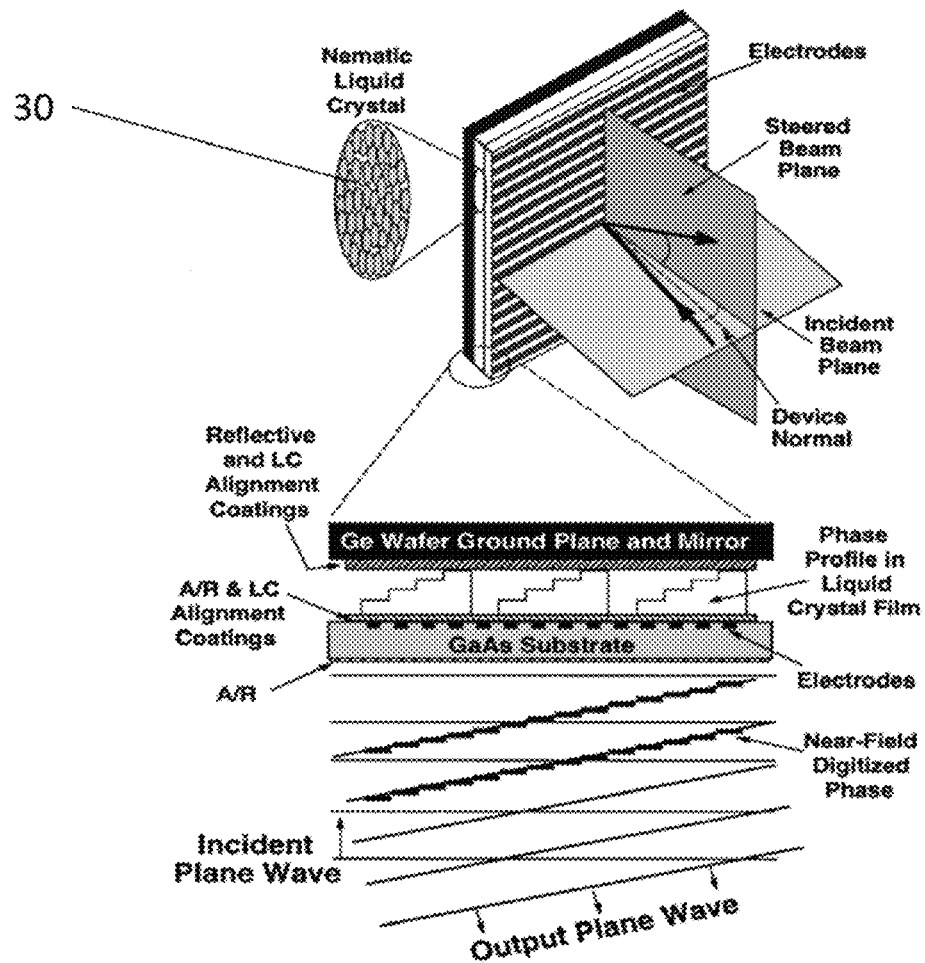
FIG. 3 is an exploded, perspective view of a standard, prior art, liquid crystal-based phase shifting array.
Figure 4:
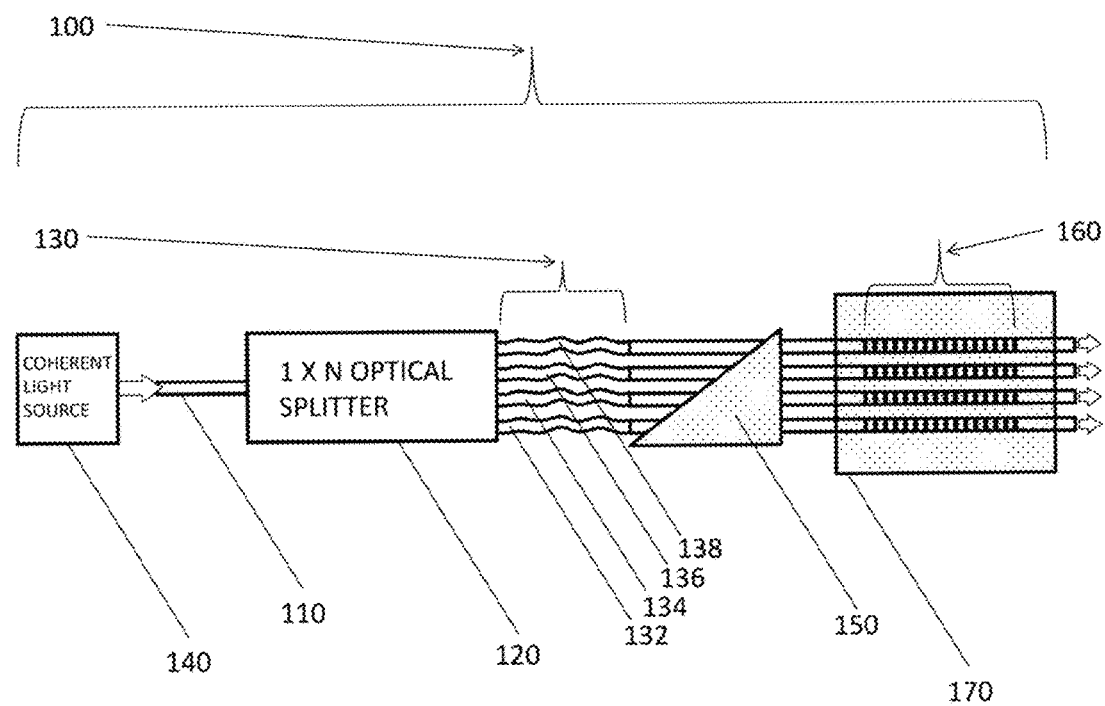
FIG. 4 is a block diagram view of a beam-steering optical transmitter including two-dimensional, optical phased array according to an embodiment of the invention.
Figure 5:
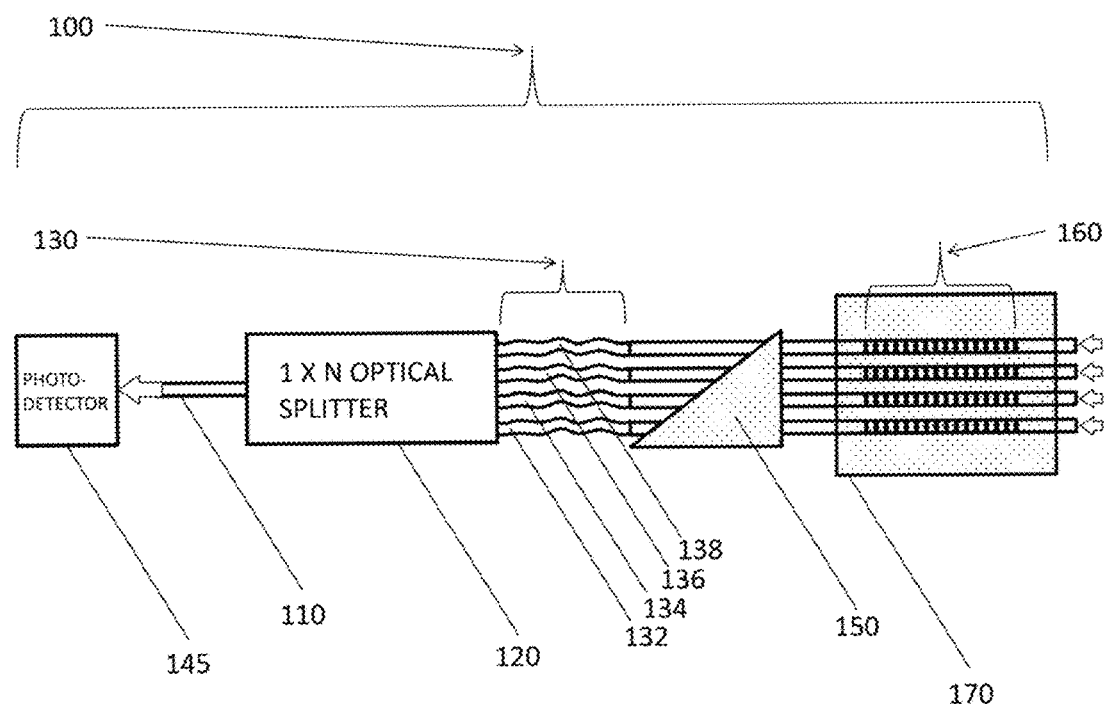
FIG. 5 is a block diagram view of an optical receiver/imager/scanner including a two-dimensional, optical phased array according to an embodiment of the invention.

An embodiment of the invention includes a device 100, as shown by way of example in FIGS. 4 and 5. The device includes an input waveguide 110 operably connected to a 1×N optical splitter 120, which comprises a single splitter input and a plurality of splitter outputs (i.e., N splitter outputs). The plurality of splitter outputs is out of phase and includes a non-uniform phase front. The device 100 includes a one-dimensional phase compensation array 130 communicating with the optical splitter 120. The phase compensation array 130 includes a plurality of N serpentine optical waveguides. (For the purpose of this patent application, the terms serpentine waveguides and S-bend waveguides are equivalent). FIGS. 4 and 5 only shows four serpentine optical waveguides 132, 134, 136, 138 for ease of understanding. However, one of ordinary skill in the art will readily appreciate that the phase compensation array 130 includes as many serpentine optical waveguides as optical splitter 120 has splitter outputs. The phase compensation array 130 receives the non-uniform phase front and outputs a uniform phase front. The optical splitter 120 or the phase compensation array 130 includes an optical input signal. The optical input signal includes coherent light with a fixed free-space wavelength. For example, the optical input signal is generated by a coherent light source 140 with the fixed wavelength that operably communicates with the input waveguide 110, such as shown by way of illustration in FIG. 4. As another example, the optical input signal is received by a coherent light detector 145 with a fixed wavelength that operably communicates with the input waveguide 110, such as shown by way of illustration in FIG. 5. Each serpentine waveguide of the plurality of serpentine waveguides 132, 134, 136, 138 includes a width greater than the free-space wavelength.

Figure 6A:
FIG. 6A is a diagrammatic view of a Y-branch-type optical splitter according to an embodiment of the invention.
Figure 6B:
FIG. 6B is a diagrammatic view of a directional coupler-type optical splitter according to an embodiment of the invention.
Figure 6C:
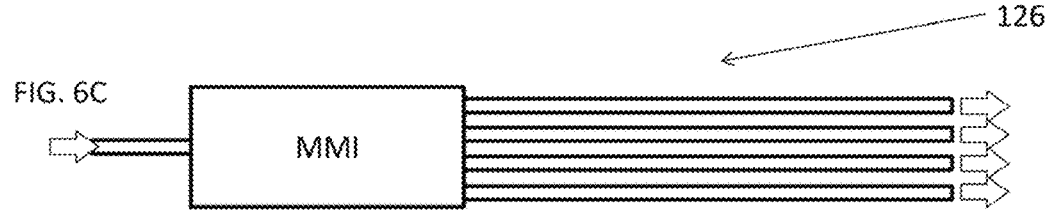
FIG. 6C is a diagrammatic view of a 1×N multi-mode interference-type optical splitter according to an embodiment of the invention.

Optionally, the optical splitter 120 includes at least one standard Y-branch optical splitter 122, such as shown by way of example in FIG. 6A, a standard directional coupler 124, such as shown by way of example in FIG. 6B, or a standard multimode interference splitter 126, such as shown by way of example in FIG. 6C. Optionally, the optical splitter 120 includes a plurality of integrated optical waveguides on a substrate.

Optionally, each serpentine optical waveguide of the plurality of serpentine optical waveguides 132, 134, 136, 138 corresponds to a respective splitter output of the plurality of splitter outputs. Each serpentine optical waveguide of the plurality of serpentine optical waveguides 132, 134, 136, 138 includes a respective path length for bringing the respective splitter output of the plurality of splitter outputs in phase.

Optionally, the phase compensation array 130 includes a plurality of array outputs. The device further includes a linear gradient phase shifter 150 communicating with the phase compensation array 130. The linear gradient phase shifter 150 applies different (and, more particularly, linearly varying) phase shifts to the different waveguides (as suggestively indicated by the dotted triangular shape of linear gradient phase shifter 150 in FIGS. 4 and 5. The bottom waveguide experiences a larger phase shift than the top waveguide due to the triangular phase shifter 150 in FIGS. 4 and 5). The linear gradient phase shifter 150 imparts a linearly-varying phase shift across the plurality of array outputs, thereby steering a beam along a first angle in a first plane. The linear gradient phase shifter controls the phase of the individual waveguides. As such, the steering occurs along the plane defined by the 1-D array of waveguides, and the steering angle is confined to this plane. For example, the first angle in the first plane is an azimuthal angle. Optionally, the linear gradient phase shifter 150 includes a tunable linear gradient phase shifter. The tunable linear gradient phase shifter 150 includes a standard thermo-optic phase shifter, a standard electro-optic phase shifter, or a standard micro-electro-mechanical system index perturbation phase shifter. For example, the linear gradient phase shifter 150 optionally takes advantage of standard thin-film surface heaters to induce a thermo-optic phase shift using a standard thermo-optic phase shifter. As another example, the linear gradient phase shifter takes advantage of standard electro-optic effects. As yet another example, the linear gradient phase shifter takes advantage of standard evanescent field interaction using a standard micro-electro-mechanical system ("MEMS") index perturbation phase shifter. An example of a standard MEMS index perturbation phase shifter is found in U.S. Pat. No. 9,395,177 to Pruessner et al., which is incorporated herein by reference. For instance, the linear gradient phase shifter 150 for θ-angle steering includes an array of standard MEMS microbridges of varying lengths. As another instance, the linear gradient phase shifter 150 for θ-angle steering includes a standard, single MEMS membrane.

Optionally, the device further includes a waveguide grating out-coupler communicating with the linear gradient phase shifter. Optionally, the device further includes a tunable uniform phase shifter 160 communicating with the waveguide grating out-coupler 170. The tunable uniform phase shifter 160 applies the same (i.e., uniform) phase shift across the entire grating array as suggestively indicated by the rectangular shape of the tunable uniform phase shifter 160 in FIGS. 4 and 5. The tunable uniform phase shifter 160 steers the flat phase front along a second angle in a second plane. The second plane is perpendicular to the first plane. For example, the second angle in the second plane is an elevational angle. Optionally, the waveguide grating out-coupler 170 includes a modulated refractive index and a physical grating period. The tunable uniform phase shifter 160 controls the modulated refractive index, thereby controlling an effective grating period. The effective grating period is a function of the modulated refractive index and the physical grating period. Optionally, the tunable uniform phase shifter 160 includes a second thermo-optic phase shifter, a second electro-optic phase shifter, or a second micro-electro-mechanical system index perturbation phase shifter. In other words, the tunable uniform phase shifter 160 optionally takes advantage of standard thin-film surface heaters to induce a thermo-optic phase shift using a standard thermo-optic phase shifter. Alternatively, the tunable uniform phase shifter takes advantage of a standard electro-optic phase shifter. Alternatively, the tunable uniform phase shifter takes advantage of standard evanescent field interaction using a standard micro-electro-mechanical system ("MEMS") index perturbation phase shifter. An example of a standard MEMS index perturbation phase shifter is found in U.S. Pat. No. 9,395,177 to Pruessner et al., which is incorporated herein by reference. For example, the tunable uniform phase shifter 160 for φ-angle steering is optionally embodied as an array of standard MEMS microbridges of equal length covering waveguide grating out-coupler. Alternatively, the tunable uniform phase shifter 160 for φ-angle steering is optionally embodied as a standard, single MEMS membrane.

Optionally, the device further includes an optical transmitter, as shown by way of illustration in FIG. 4; the optical transmitter includes the optical splitter, the phase compensation array, the linear gradient phase shifter, the waveguide grating out-coupler, and the tunable uniform phase shifter as well as a standard coherent light source 140 having a fixed free-space wavelength. The coherent light source 140 includes, for example, a standard laser. Optionally, the device further includes an optical receiver, an imager, or a scanner, as shown by way of illustration in FIG. 4; the optical receiver, imager, or scanner includes the optical splitter, the phase compensation array, the linear gradient phase shifter, the waveguide grating out-coupler, and the tunable uniform phase shifter as well as a standard light detector 145. The light detector 140 includes, for example, a standard photodetector.

Another embodiment of the invention is described as follows with reference to FIGS. 4, 5, 6A, 6B, and 6C. This embodiment includes a device, including an integrated optical phased array platform, which enables beam steering in two-dimensions using a simplified control scheme (i.e. one control for steering along the θ-angle, and one control for the φ-angle).

This embodiment includes a standard, input integrated optical waveguide 110. The optical waveguide 110 is, for example, a standard shallow-etched rib waveguide or a standard deeply-etched ridge waveguide fabricated from, but not limited to, semiconductor or dielectric thin-films.

This embodiment includes a standard 1×N optical splitter 120 for splitting light with power $P_0$ from the single input waveguide 110 into N-waveguides with equal splitting ratio (i.e. each waveguide has power equal to $P_0/N$). The optical splitter 120 is, for example, a 1×N multi-mode-interference ("MMI") splitter, as shown by way of illustration in FIG. 6C, a cascade of 1×2 MMI splitters, a cascade of Y-branch waveguides 122, or a cascade of directional coupler splitters 124. MMI splitters are advantageously compact, with closely-spaced output waveguides.

This embodiment includes a standard phase compensation array 130 for ensuring that all N-waveguides have equal phase. The phase compensation array 130, for example, takes the form of S-bend waveguides in which an additional path length (the "S") compared to a straight waveguide provides an additional phase shift as needed.

This embodiment includes a standard linear gradient phase shifter 150 for applying a linear phase gradient across the N-waveguides. The linear gradient phase shift can be produced using by a standard triangular heater electrode above the waveguides so that each waveguide is heated by a different heater length. A single control signal will then impart a linear phase ramp (e.g. via the thermo-optic effect) across the waveguide set. The linear phase ramp in turn will result in θ-angle beam steering. Other standard means for achieving a gradient phase ramp can also be used in place of the thermo-optic heaters.

This embodiment includes a standard waveguide grating out-coupler 160, which includes shallow gratings etched into each waveguide following the gradient phase shifter. The grating can be uniform so that the light emission is a fixed percentage of the waveguide power along the length of the waveguide. Alternatively, because the optical power residing in the waveguide decreases as more light is emitted from the grating, the grating strength is optionally varied to ensure that the emitted optical power is equal along any point along the grating.

This embodiment includes a standard tunable uniform phase shifter 170 that applies a uniform phase shift along the length of the grating. For example, the tunable uniform phase shifter 170 includes a set of standard metal heaters placed next to the waveguide grating out-coupler 160. In this manner, a single control can be used to uniformly heat the grating and thereby change the grating emission angle (φ-angle) via the thermo-optic effect. Alternatively, other standard means for achieving a gradient phase ramp can also be used in place of the thermo-optic heaters.

Thermo-Optic Phase Shifting Using Direct Current Injection

The thermo-optic effect in silicon is modest, resulting in a temperature-dependent phase shift $\Delta\phi(\Delta T)=2\pi(dn/dT)\Delta T$, where $dn/dT \approx 1.9 \times 10^{-4}/K$ is silicon's thermo-optic coefficient and $\Delta T$ is the temperature increase of the silicon waveguide. Another embodiment of the invention includes a 2-D optical phased array, which includes thin-film metal heaters that are fabricated on top of a 600 nm thick $SiO_2$ layer that serves as the silicon waveguide's top cladding. Alternatively, the metal heater is fabricated directly on top of the silicon waveguide because silicon has a significantly higher thermal conductivity compared to $SiO_2$.

Thermo-optic effects can be greatly enhanced even further by using direct current injection instead of surface thin-film heaters. In this embodiment of the invention, the silicon layer is doped slightly (e.g., at a doping level of about 1e16 atoms/cm$^3$). Two standard electrodes on either side of the grating enable current to flow and to heat the grating directly. In such an embodiment of the invention, direct current injection increases the grating heater efficiency.

Evanescent Field Perturbation: Power-Efficient Phase Shifting with Low Cross-Talk As an alternative to direct current injection to change the grating phase and steering angle, another embodiment of the invention is described as follows with reference to FIG. 10. This embodiment of the invention combines a standard grating 160 on a standard, silicon-on-insulator ("SOI") waveguide 190 and a standard micromechanical membrane to tune the grating's steering angle. Block 200 represents the insulator, e.g., SiO2, and block 210 represents the silicon substrate for the waveguide 190. Thin silicon waveguides can have a large evanescent field 220, which overlaps the MEMS microbridge 180 and which is the component of the optical mode that resides outside of the core—in this case, in the air region above the waveguide. The phase of the propagating optical mode can be controlled using a standard micromechanical membrane (or standard microbridge) 180 that is brought into close proximity to the waveguide surface. By adjusting the height of the microbridge, the phase in a waveguide is modified substantially (e.g., $\Delta\phi > \pi$), such as described in a U.S. Pat. No. 9,395,177 to Pruessner et al., which is incorporated herein by reference.

In this embodiment of the invention, Applicants recognized that this evanescent field opto-mechanical phase shifter is applicable to beam steering. The grating emission angle follows the relation $\sin(\phi) = (d_{GRATING} n_{EFF} - \lambda_0)/d_{GRATING}$, where $d_{GRATING}$ is the grating period, $n_{EFF}$ is the waveguide effective index, and $\lambda_0$ is the wavelength. By tuning $n_{EFF}$ using the opto-mechanical evanescent field, interaction between micromechanical membrane (or standard microbridge) 180 (e.g., a suspended, standard MEMS microbridge perturber) and the waveguide's optical mode, the grating 160's $\phi$-angle can be steered. Steering angles of $\Delta\phi > 10°$ are expected, using this embodiment of the invention.

Advantages of this modified phase shift embodiment include low-power operation. By using capacitive electrostatic actuation, the MEMS perturber 180 can be displaced with practically no electrical power. Electrostatic actuation requires a bias voltage, but draws essentially no current. Besides low power operation, phase sifting using evanescent field interaction is essentially cross-talk-free. Finally, MEMS structures can be operated at >>1 MHz and therefore have substantially faster response times than standard thermo-optic approaches.

Electro-Optic Phase Shifters

As an alternative to thermo-optic or MEMS-based phase shifters, an embodiment of the invention includes standard electro-optic phase shifters for either the linear gradient phase shifter 150 or the tunable uniform phase shifter 170. Electro-optic materials (e.g., III-V semiconductors) have an advantage in that they can potentially operate at high-speeds (e.g., at GHz-rates).

Apodized Grating

In another embodiment of the invention, an alternative to a grating 160 with constant pitch and strength (i.e., etch depth) is a standard apodized grating in which the grating strength is weakest at the input and becomes stronger along the length of the grating. This ensures that the optical power emitted at any point along the grating is constant and that the power emitted across the grating is uniform. The grating strength can be modified through a variety of techniques including locally varying the etch depth or by varying the duty cycle. Alternatively, the apodized grating includes a standard periodic sidewall corrugation along the length of the waveguide. The grating strength would then be modulated by varying the depth of the sidewall corrugation or the duty cycle.

1-Dimensional Phased Array Beam Steering Example

Figure 7:
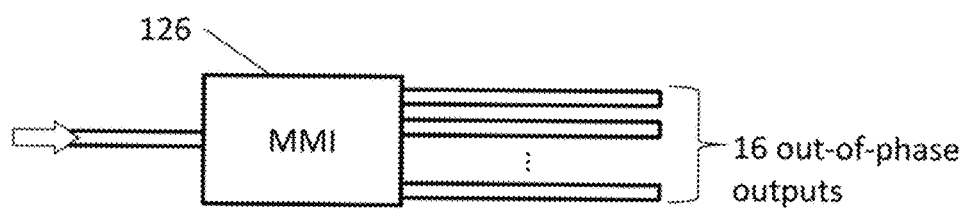
FIG. 7 is a block diagram of a portion of an embodiment according to the invention including an optical splitter.

The phase profile at the output of the 1×N optical splitter 120 is predictable, and is described as follows with reference to FIGS. 7 and 8. For case of understanding, FIG. 7 shows a 1×16 optical splitter, in this case, an illustrative MMI optical splitter 126 with one input and sixteen outputs. One of ordinary skill in the art will recognize that practical optical splitters according to an embodiment of the invention have more or less outputs depending on the application requirements.

The phase profile from this MMI optical splitter 126 is predictable and follows $\theta_q = \beta_0 L_0 + N - 2 - 4q(q+1)/4N\pi$, where N is the even number of MMI outputs and q=0, 1, 2, ... N/2−1 is the respective output port with phase $\theta_q$. FIG. 8 shows the measured and calculated phase as a function of the MMI output waveguide number for the 1×16 MMI. As can be seen from FIG. 8, the phase profile of the optical splitter's outputs is non-uniform. For the case of the illustrative MMI optical splitter 126, the phase profile is parabolic.

Figure 9:
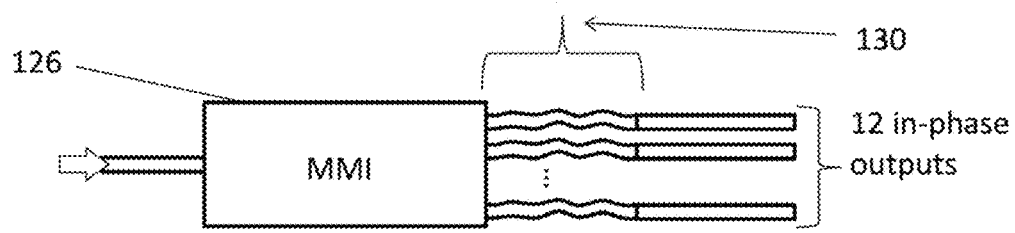
FIG. 9 is a block diagram of a portion of an embodiment according to the invention including an optical splitter and a phase compensation array.
Figure 10:
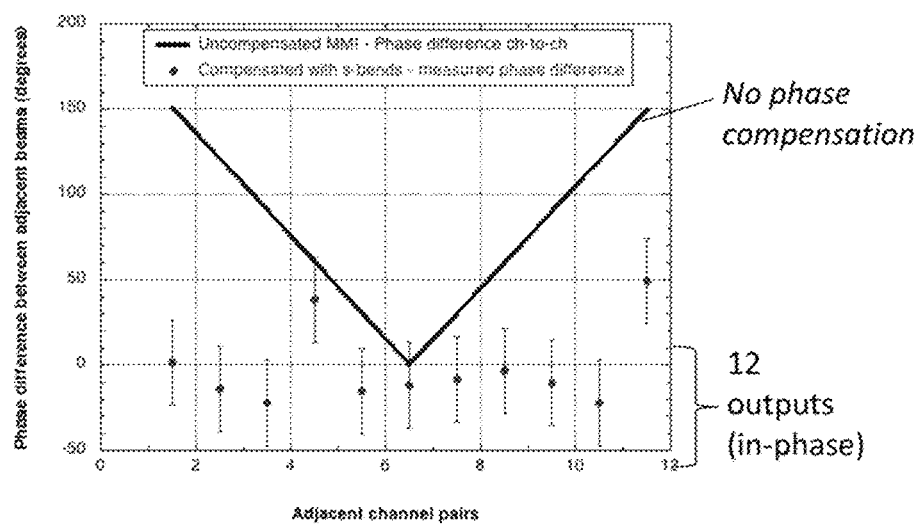
FIG. 10 is an illustrative graph showing waveguide output signals having compensated phase according to an embodiment of the invention, as compared to signals that are out of phase.
Figure 11:
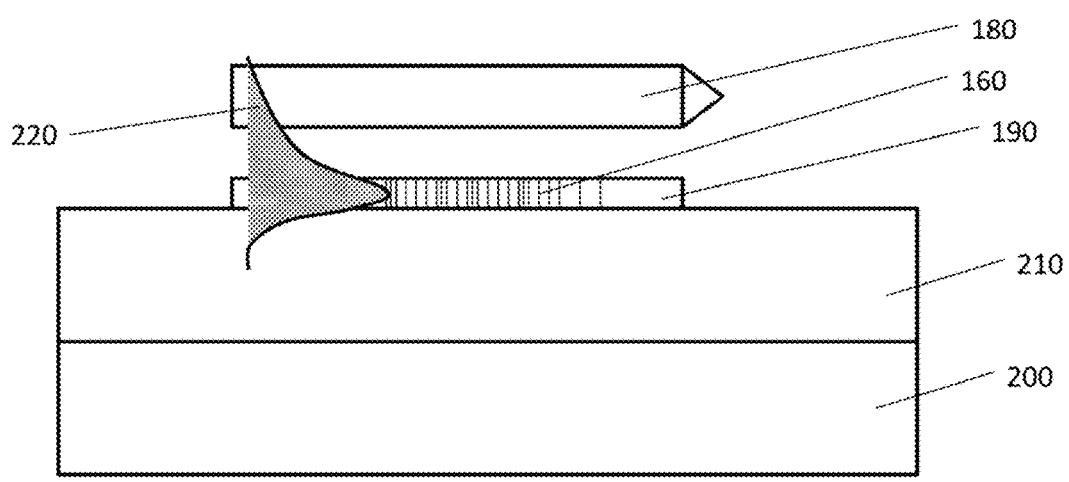
FIG. 11 is a cross-sectional view of a device according to an embodiment of the invention that includes an evanescent field opto-mechanical phase shifter.

For beam forming it is critical that the output waveguides have identical phase initially to achieve a collimated beam. Continuing with the 1-Dimensional Phased Array Beam Steering Example, an embodiment of the invention includes a phase compensation array 130 and is described as follows, with reference to FIGS. 9 and 10. The phase compensation array 130 ensures that all waveguides have identical phase (i.e. to compensate for the parabolic phase profile shown in FIG. 8). The phase compensation for each waveguide is achieved by simply adding a respective additional path length in the form of an S-bend for each output from the optical splitter. The respective additional path lengths are selected to bring the optical splitter outputs are in-phase. The phase compensation is completely passive and no initial calibration is required. For example, FIG. 9 shows a portion of an embodiment of the invention. For ease of understanding only, this portion includes a MMI optical splitter 126. For ease of understanding only, the optical splitter shown in FIG. 9 has one input waveguide and twelve output waveguides. One of ordinary skill in the art will recognize that practical optical splitters according to an embodiment of the invention have more or less outputs depending on the application requirements. FIG. 10 shows a graph illustrating a representative curve representing no phase compensation across the twelve outputs in the absence of phase compensation array 130. On the same graph, FIG. 10 shows estimates and measurements of phase differences between the twelve outputs, which represent phase compensation across the twelve outputs in the presence of phase compensation array 130. FIG. 10 shows that the phase compensation array has brought the twelve outputs substantially in-phase.

For example, by applying a bias to a standard triangular heater, a linear gradient phase shift can be applied to steer the beam along the θ-angle direction.

2-Dimensional Phased Array Beam Steering Example

Continuing with the 1-Dimensional Phased Array Beam Steering Example given above, to produce a 2-D optical phased array, the device further includes a waveguide grating out-coupler 160. For example, the waveguide grating out-coupler 160 includes shallow-etched gratings patterned on the surface of the output waveguides after the S-bend phase compensation array 130. The gratings the waveguide grating out-coupler 160 couple light out of the waveguides perpendicularly to the chip on which the 2-D optical phased array is located. They also enable the development of 2-D optical phased arrays. Beam steering along the $\phi$-angle is performed by tuning the wavelength in a standard manner to modify the grating emission angle.

In another embodiment of the invention, the laser 140 includes a fixed-wavelength laser source, as opposed to a tunable laser source, to simplify construction and operation of the device. A standard tunable uniform phase shifter 170 is used to change the phase of the grating and thereby steer the emission $\phi$-angle using a fixed laser wavelength. For example, the tunable uniform phase shifter 170 includes one or more thermo-optic phase shifters placed next to the grating waveguides. Alternatively, other standard phase shift approaches are used. The combination of a linear gradient phase shifter and a tunable uniform phase shifter achieves simultaneous steering along the $\theta$-angle and $\theta$-angle, respectively. For example, an embodiment of the invention achieves 2-D non-mechanical beam steering with $\Delta\theta > 7°$ and $\Delta\phi > 1.2°$. In another example, a 2-D optical phased array according to an embodiment of the invention including two triangular linear gradient phase shifters achieves an azimuthal steering angle of $\Delta\phi > 15°$. As another example, a 2-D optical phased array according to an embodiment of the invention including large heaters placed to the side of the waveguide achieves an elevational steering angle of $\Delta\phi > 2.9°$. Even larger steering angles can be expected with standard optimization of the phase shifters.

Large Fabrication Tolerance Benefit

Figure 8:
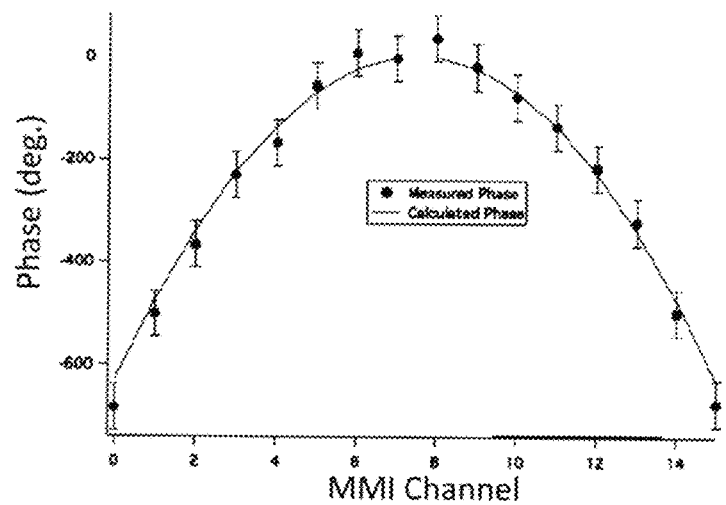
FIG. 8 is a graph of an illustrative phase profile of optical splitter outputs according to an embodiment of the invention.

Another embodiment of the invention utilizes S-bend waveguides to compensate the parabolic phase of the MMI output waveguides, for example, as shown by way of illustration in FIG. 8. Random variations in the waveguide width during processing can lead to a change in the waveguide effective index, which makes it difficult to accurately compensate the MMI phase using a fixed waveguide length in an S-bend waveguide.

This embodiment of the invention takes advantage of wide waveguides. For example, the width of the waveguides is greater than the wavelength of the light traversing therethrough, but is still approximately on the same order of magnitude of the light's wavelength (e.g., 2.6 μm width for the devices using light having 1.55 μm wavelength). For realistic fabrication tolerances in the waveguide width of $+/-10$ nm, the variation in the waveguide effective index is negligible. In contrast, narrow waveguides (w=500 nm) suffer from phase errors much greater than $+/-90°$ for fabrication errors of $+/-10$ nm (over 100λ propagation distances). Therefore, wide waveguides according to this embodiment of the invention enable accurate phase compensation using S-bend waveguide segments.

The accurate phase control that inures from wide waveguides also simplifies steering along the $\theta$-angle. A flat phase front across the waveguides (after the phase compensation array 130), for example, allows use of a standard, triangular-shaped heater to impart a linear gradient phase across the waveguides. For example, such a triangular-shaped heater includes a single standard heater with a single control signal for the entire optical phased array. In contrast, previous silicon optical phased arrays required individual phase control of each emitter in the array.

Simplified Controls Benefit

Advantageously, another embodiment of the invention only includes two control signals: one to control the azimuthal angle ($\theta$-angle) and one to control the elevation ($\phi$-angle) for a given wavelength laser source. In contrast, prior art 2-D optical phased arrays either required a wavelength-tunable laser for wavelength steering of the $\phi$-angle or they required $N^2$ controls for an N×N element phased array.

Scaling and Fill Factor Benefit

Advantageously, another embodiment of the optical phased array can be scaled to large size without increasing the number of control signals; that is, irrespective of the grating size, steering requires a single control for the $\theta$-angle and a second control for the $\phi$-angle. A 1×N MMI splitter according to this embodiment of the invention, for example, can be scaled up to large N. The phase of each output waveguide is predictable even with fabrication imperfections and the phase compensation array simply requires additional S-bend waveguides. Increasing the number of output waveguides from the 1×N MMI splitter increases the optical phased array aperture along the $\theta$-angle. Scaling along the $\phi$-angle is accomplished by simply increasing the length of the grating. The aperture along the $\phi$-angle is directly proportional to the grating length.

Advantageously, another embodiment of the invention benefits from a large fill-factor of the waveguide grating out-coupler 160. That is, although the waveguide spacing of the waveguide grating out-coupler 160 is much greater than λ and provides only a modest fill-factor, the grating 160 can have a period as small as $\lambda/2n_{\textit{eff}}$ and hence provides the largest possible fill-factor.

Power Handling Benefit

Advantageously, another embodiment of the invention is easily scaled up to encompass a larger number of emitting elements in the optical phased array. By scaling up to a large number of emitters the optical power contained in a steerable beam can be increased substantially.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Lettters Patent of the United States is:

1. A device comprising:
   an optical splitter comprising a plurality of splitter outputs, said plurality of splitter outputs being out of phase and comprising a non-uniform phase front; and
   a one-dimensional phase compensation array communicating with said optical splitter, said phase compensation array comprising a plurality of serpentine optical waveguides, said phase compensation array receiving the non-uniform phase front and outputting a uniform phase front, wherein one of said optical splitter and said phase compensation array comprises an optical input signal, said optical input signal comprising a fixed free-space wavelength, wherein each serpentine waveguide of said plurality of serpentine waveguides comprises a width greater than the free-space wavelength.

2. The device according to claim 1, wherein said optical splitter comprises one of at least one Y-branch optical splitter, a multimode interference splitter, and a directional coupler.

3. The device according to claim 1, wherein said optical splitter comprises a plurality of integrated optical waveguides on a substrate.

4. The device according to claim 1, wherein each serpentine optical waveguide of said plurality of serpentine optical waveguides corresponds to a respective splitter output of said plurality of splitter outputs, said each serpentine optical waveguide of said plurality of serpentine optical waveguides comprising a respective path length for bringing said respective splitter output of said plurality of splitter outputs in phase.

5. The device according to claim 1, wherein said phase compensation array comprises a plurality of array outputs, said device further comprising:
a tunable linear gradient phase shifter communicating with said phase compensation array to impart a linearly-varying phase shift across said plurality of array outputs, thereby steering a beam along a first angle in a first plane.

6. The device according to claim 5, wherein said linear gradient phase shifter comprises a tunable linear gradient phase shifter, wherein said tunable linear gradient phase shifter comprises one of a first thermo-optic phase shifter, a first electro-optic phase shifter, and a first micro-electro-mechanical system index perturbation phase shifter.

7. The device according to claim 5, further comprising:
a waveguide grating out-coupler communicating with said linear gradient phase shifter.

8. The device according to claim 5, further comprising:
a tunable uniform phase shifter communicating with said waveguide grating out-coupler, said tunable uniform phase shifter steering the flat phase front along a second angle in a second plane, said second plane being perpendicular to said first plane.

9. The device according to claim 8, wherein said waveguide grating out-coupler comprises a modulated refractive index and a physical grating period,
wherein said tunable uniform phase shifter controls the modulated refractive index, thereby controlling an effective grating period, said effective grating period relating to said modulated refractive index and said physical grating period.

10. The device according to claim 8, wherein said tunable uniform phase shifter comprises one of a second thermo-optic phase shifter, a second electro-optic phase shifter, and a second micro-electro-mechanical system index perturbation phase shifter.

11. The device according to claim 8, further comprising:
one of an optical transmitter, an optical receiver, an imager, and a scanner, said one of said optical transmitter, said optical receiver, said imager, and said scanner comprising said optical splitter, said phase compensation array, said linear gradient phase shifter, said waveguide grating out-coupler, and said tunable uniform phase shifter.

* * * * *